Aug. 7, 1928.
1,680,120
R. N. SHONER
BALANCE WHEEL FOR ENGINES
Filed Sept. 9, 1927
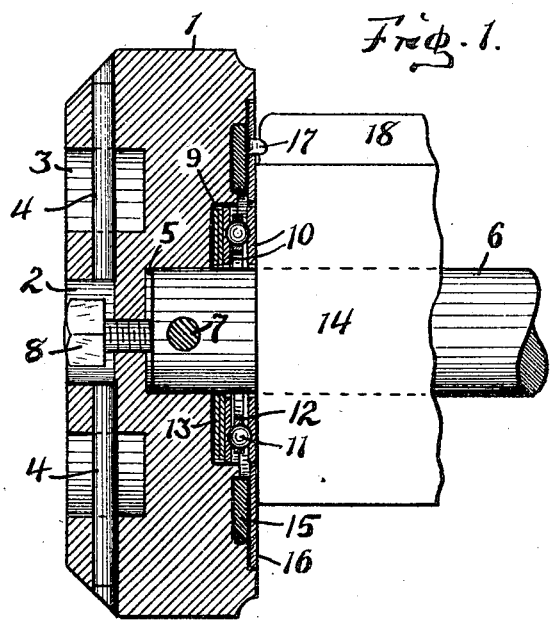
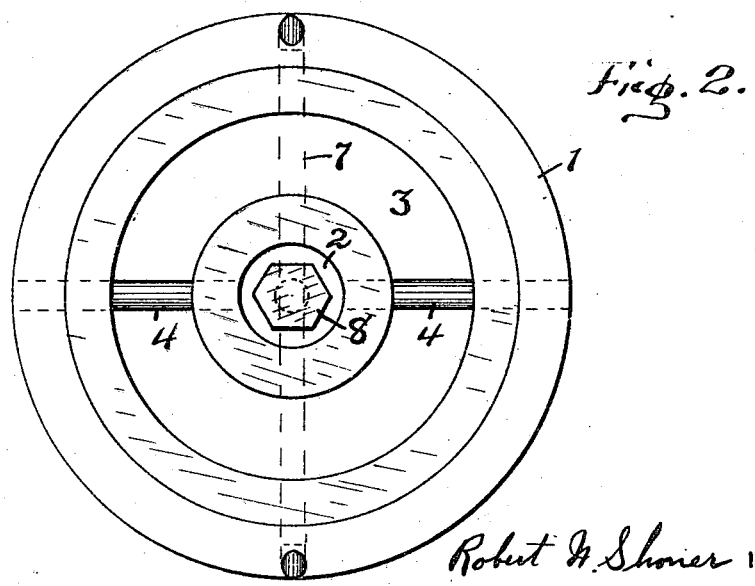
Robert N. Shoner INVENTOR
BY
W. G. Burns ATTORNEY Patented Aug. 7, 1928.

1,680,120

UNITED STATES PATENT OFFICE.

ROBERT N. SHONER, OF FORT WAYNE, INDIANA, ASSIGNOR TO UTILITY STRATE MANUFACTURING COMPANY, A CORPORATION OF INDIANA.

BALANCE WHEEL FOR ENGINES.

Application filed September 9, 1927. Serial No. 218,433.

This invention relates to improvements in balance wheels for engines, and especially adaptable to internal combustion automobile engines. The object of the improvement is to provide an attachment applicable to the crank-shaft of an engine in substitution for the fan belt pulley ordinarily provided on engines of known construction, which attachment includes means for taking up the end play of the crank-shaft. A further object is to so construct the attachment that it may be readily applied in place of the ordinary fan belt pulley and serve all of the purposes of the pulley so replaced by it, and act as a balance wheel to further stabilize the front end of the crank-shaft in its operation.

These objects are accomplished by the construction illustrated in the accompanying drawings, in which:—

Fig. 1 is a central cross section of the attachment applied to the crank-shaft of an engine; and Fig. 2 is a front end elevation of the same.

The characters appearing in the description refer to parts shown in the drawings and designated thereon by corresponding characters.

The invention consists of a fly-wheel 1 having a central recess 2 in its front end and also a concentric annular channel 3 opening through its front face. A pair of pins 4 disposed in longitudinal alinement with each other are positioned transversely in the wheel 1, each of which extends through the annular channel 3, which pins are for engagement with the head of a starting crank (not shown) which crank is of the ordinary type having a head provided with a notched flange that is positioned in the channel 3 while starting the engine.

The wheel 1 has in its rear end an axial socket 5 into which the front end of the crank-shaft 6 of the engine extends when the wheel is positioned thereon, and the wheel is secured to the shaft by a pin 7 that extends transversely through the wheel and shaft, across the axis thereof. A set screw 8 has threaded relation in the wheel in the axis thereof, its head being contained in the recess 2, and its inner end bearing against the front end of the crank-shaft 6, whereby, when the screw is tightened against the shaft, the pin 7 is clamped tightly between the shaft and pulley, which prevents its dislodgment.

The rear end of the pulley is chamfered as indicated by 9, and in the chamfer is contained a thrust bearing consisting of a pair of spaced race-ways 10 between which is disposed an annular series of balls 11 arranged in a cage 12 of usual construction. Also, back of the innermost race-way 10 is disposed several shims 13. The outermost race-way bears against the front end of the engine housing 14, and the shims are inserted so as to take up the play between the wheel and the thrust bearing.

In the rear end of the wheel 1 is also disposed an annular pad 15 that is saturated with oil or grease, which pad encompasses the bearing and is held in place in the wheel by a retaining ring 16, the latter having a tongue 17 that projects rearwardly and is engaged by a projection 18 on the engine housing so that rotation of the retaining ring is thereby prevented.

In applying the invention to the engine of an ordinary automobile, the fan belt pulley thereon is removed and the wheel 1 is mounted on the front end of the crank-shaft in its stead and is secured by driving the pin 7 into the wheel and through the shaft, and then tightening the screw 8 against the end of the shaft. By introducing shims 13 of sufficient number and thickness between the thrust bearing and the wheel, the wheel and crank-shaft are maintained in their forwardmost position relative to the engine housing, whereby longitudinal play of the crank-shaft is obviated. In this manner the usual noise and wear of the crank-shaft and operating parts connected therewith is greatly reduced. Also, because of the weight of the wheel 1 its balancing effect on the front end of the crank-shaft promotes steadiness and quietness in the operation of the engine.

What I claim is:—

In combination with an engine having a crank-case and crank-shaft mounted therein, a fly wheel positioned on the end of the crank-shaft adjacent the end of the crank-case, said wheel having an annular chamfer in its rear face; a pin extending transversely through said shaft into the wheel; a screw threaded in said wheel in line with the axis thereof and bearing against the end of the crank-shaft whereby said pin is locked in place; a thrust bearing member including shims therefor disposed in said chamfer and acting against the adjacent end of the crank-case; an annular lubricating pad disposed in the wheel encompassing said bearing; and a retaining ring for said pad having a projecting tongue that engages the crank-case whereby rotation of the ring is prevented.

In testimony whereof I affix my signature.

ROBERT N. SHONER.